United States Patent
Watanabe et al.

(10) Patent No.: US 7,376,488 B2
(45) Date of Patent: May 20, 2008

(54) TAUGHT POSITION MODIFICATION DEVICE

(75) Inventors: Atsushi Watanabe, Tokyo (JP); Jun Mizuno, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 554 days.

(21) Appl. No.: 10/786,055

(22) Filed: Feb. 26, 2004

(65) Prior Publication Data
US 2004/0172168 A1     Sep. 2, 2004

(30) Foreign Application Priority Data
Feb. 27, 2003   (JP)   ............... 2003/051574

(51) Int. Cl.
*G05B 19/00*   (2006.01)
(52) U.S. Cl. ...................... 700/264; 700/257
(58) Field of Classification Search ................ 700/245, 700/257
See application file for complete search history.

(56) References Cited

U.S. PATENT DOCUMENTS

| | | | | |
|---|---|---|---|---|
| 4,771,222 A * | 9/1988 | Nakashima et al. | ........ | 318/572 |
| 5,608,618 A * | 3/1997 | Kosaka et al. | ................ | 700/61 |
| 5,748,854 A * | 5/1998 | Watanabe et al. | ........... | 700/258 |
| 5,980,082 A * | 11/1999 | Watanabe et al. | ............. | 700/86 |
| 5,987,591 A * | 11/1999 | Jyumonji | .................... | 700/259 |
| 6,140,788 A * | 10/2000 | Watanabe et al. | ...... | 318/568.22 |

FOREIGN PATENT DOCUMENTS

| | | |
|---|---|---|
| EP | 0 780 197 A1 * | 6/1997 |
| EP | 0 792 726 A1 | 9/1997 |
| EP | 0 997 236 A1 | 5/2000 |
| GB | 2 087 107 | 5/1982 |
| JP | 07-084631 | 3/1995 |
| JP | 07-295625 | 11/1995 |
| JP | 08-71969 | 3/1996 |
| JP | 11-85249 | 3/1999 |

OTHER PUBLICATIONS

Notification of Grounds for Rejection for Japanese Application No. 051574/2003 dated Apr. 19, 2005.
European Search Report issued Oct. 22, 2007 in corresponding European Patent Application No. 04251075.0-1239.
Japanese Notice of Reasons for Rejection dated Jan. 30, 2007 in corresponding Japanese patent application No. 2003-51574.

* cited by examiner

*Primary Examiner*—Thomas Black
*Assistant Examiner*—McDieunel Marc
(74) *Attorney, Agent, or Firm*—Staas & Halsey LLP

(57) ABSTRACT

A taught position modification device easily correcting, in a short time, positions of taught points in a program prepared by an offline programming system. A workpiece image captured by a visual sensor and an image of a three-dimensional workpiece model having three characteristic points are displayed on a screen. Based on coordinate values of workpiece portions corresponding to the characteristic points which are specified in the workpiece image, the position and orientation of the model in a robot operating space are corrected, and also positions of taught points are corrected. When a tool end of a robot is positioned by jog feed to the operation position on a workpiece after being automatically moved to one of the corrected taught points, the taught point is modified based on the robot operating position detected at that time.

4 Claims, 7 Drawing Sheets

TAUGHT POSITION MODIFICATION DEVICE

BACKGROUND OF THE INVENTION

1. Field of the Invention

The present invention relates to a device for modifying taught positions in an operation program of a robot prepared by an offline programming system.

2. Description of Related Art

A program for machinery such as robot is sometimes prepared, using an offline programming system, on the basis of three-dimensional models of a robot, peripheral equipments, a workpiece as an object of operation, etc. Such a program ordinarily entails a considerable error of a programmed motion path with respect to a desired motion path. To reduce the error, a distal end of an operation tool or a position correction tool attached to a robot is sequentially positioned at operation points on the desired motion path (for example those on the workpiece), to detect coordinate values of these operation points in sequence, and the program is corrected using the coordinate values. When there is still a considerable error between taught points in the corrected program and the actual operation points, a further detection of operation points is made to further correct the program based on detection results.

As mentioned above, in addition to the offline programming, the detection of actual operation points at the worksite and the correction of the program prepared offline to reflect detection results are carried out for the preparation of the complete robot program.

However, three-dimensional models of robot, workpiece, etc. used for the offline programming entail a layout error with respect to an actual layout of robot, workpiece, etc., requiring the increased labor and time to correct the program. In this respect, use of three-dimensional models having the same layout as the actual one is effective, but such three-dimensional models require much labor to prepare. In addition, even if the program is prepared using such three-dimensional models, the detection of operation points and the correction of program must still be made. Thus, the complete operation program for machinery such as robot cannot be prepared with ease in a short time.

SUMMARY OF THE INVENTION

The present invention provides a taught position modification device capable of easily modifying a program prepared using an offline programming system in a short time.

A taught position modification device of the present invention modifies positions of taught points in an operation program of a robot prepared by an offline programming system, using a visual sensor arranged at a movable part of the robot. The device comprises: determining means for determining a position or an orientation of an object of operation based on positions of at least two characteristic points on an image of the object captured by the visual sensor; correction means for correcting the positions of the taught points in the operation program based on the determined position or orientation of the object; moving means for moving an operation tool or a position correction tool attached to an distal of an arm of the robot at the corrected positions of the taught points; setting means for setting a jog-feed coordinate system with respect to the corrected positions of the taught points using information from the offline programming system; and modification means for modifying the corrected positions of the taught points in the operation program based on positions of a control point of the operation tool or the position correction tool, at which positions or orientations of the operation tool or the position correction tool are designated by jog feeds using the jog-feed coordinate system such that the control point takes objective positions for the taught points.

The taught position modification device may further comprises displaying means for displaying an image of a model of the object based on information from the offline programming system, and for indicating coordinate axes of the jog-feed coordinate system in accordance with lines defined by the corrected positions of the taught points in the image of the model.

The modification means may modify the positions of subsequent taught points in accordance with modification of one of the taught points when the position of the one taught points is modified.

The moving means may move the operation tool or the position correction tool to the position of the subsequent taught point which is modified in accordance with the modification of the one taught point, on demand of an operator.

DETAILED DESCRIPTION

Figure 1:
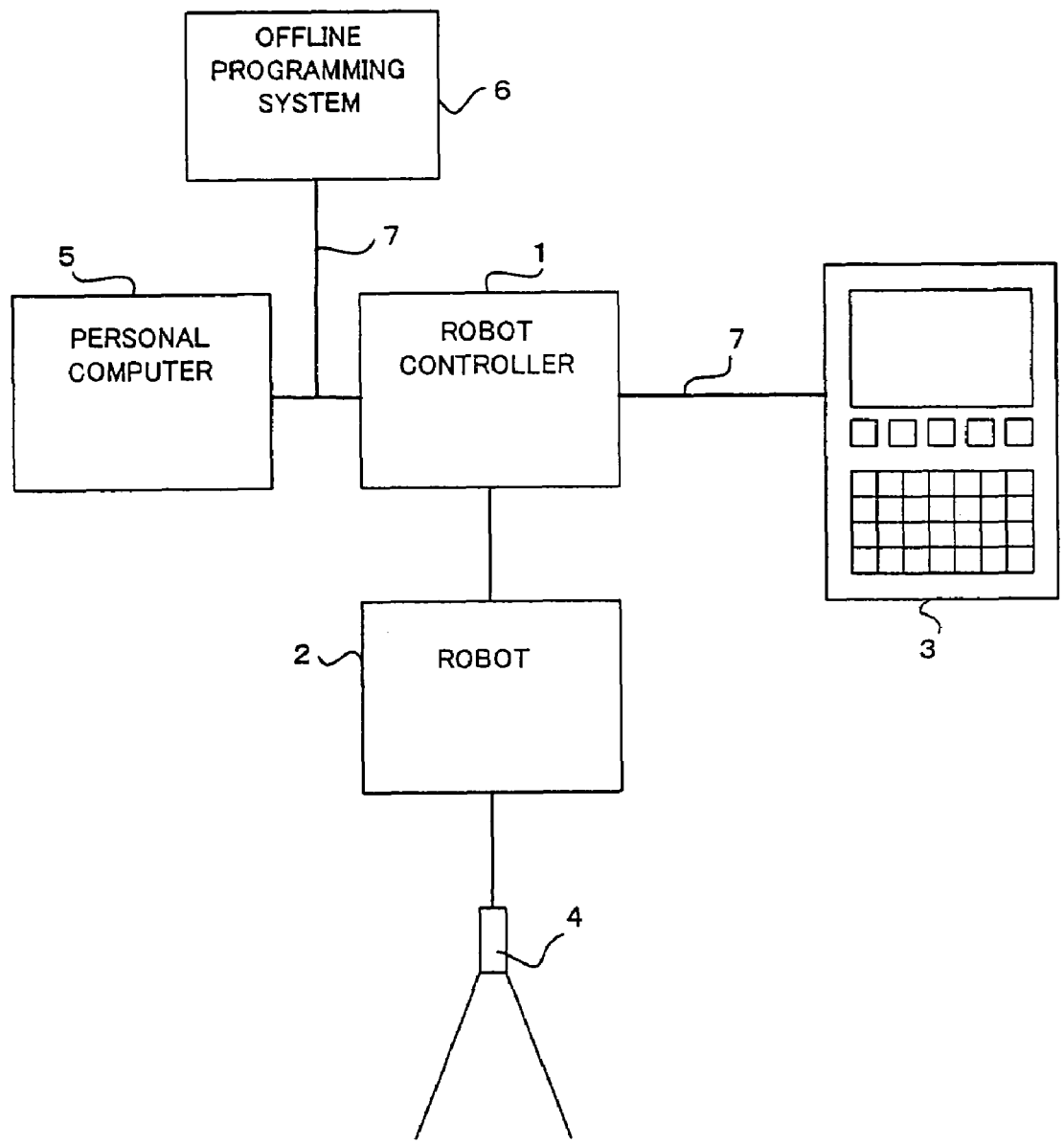
FIG. 1 is a schematic block diagram of a robot system according to one embodiment of this invention.

Referring to FIG. 1, a robot system according to an embodiment of this invention will be described.

The robot system includes a robot controller 1, and a robot 2 having robot arms, etc. serving as a movable portion of the robot. A visual sensor 4 such as a CCD camera is attached to a distal end of the robot arms. The robot controller 1 is connected to servomotors for driving the movable portion of the robot 2, and controls the servomotors to operate the robot. An information processing device (in this embodiment, a personal computer which will be referred to as PC) 5 and an offline programming system 6 are connected to the robot controller 1 via Ethernet (trademark) cables 7. A teaching pendant 3 is connected to the robot controller 1 via Ethernet (trademark) cables 7 or RS-422 cables.

In the case of Ethernet (trademark) cables being used for the connection, direct information exchange can be achieved between the teaching pendant 3, the PC 5, and the offline programming system 6. In the case of RS-422 cables being used, information exchange between the teaching pendant 3 and the PC 5 is performed through the robot controller 1.

The offline programming system 6 prepares a robot operation program (hereinafter referred to as robot program) based on a three-dimensional model as conventionally known. The PC 5 stores various data delivered from the offline programming system 6, etc., and carries out various calculations. The robot controller 1 drivingly controls the robot 2. The teaching pendant 3 comprises display means and input means. The display means displays, on a display screen, a picture image captured by the visual sensor 4, and a three-dimensional model picture image delivered from the offline programming system 6. The input means comprises software keys on the screen, hardware keys (keyboard) for inputting various command and data, an operation mode switch for selectively delivering a command to either or both of the robot controller 1 and the PC 5, and mode switches for selecting a characteristic point setting mode, a position correction mode, a taught point modification mode, etc., respectively.

In the following, correction of a robot operation program will be described for a case where the program is used by the robot 2 for arc welding a workpiece serving as an object of operation.

The robot program to be corrected is prepared by the offline programming system 6 as conventionally known.

For the preparation of the robot program, three-dimensional models of the robot, peripheral equipment, workpiece, etc. are prepared in the offline programming system. The three-dimensional models of the peripheral equipment, the workpiece, etc. may be prepared in the offline programming system 6 as conventionally known, or may be prepared therein using two dimensional drawing data prepared by a CAD. The three-dimensional model of the robot is prepared using data stored in a data storage device, for instance.

Next, taught points for robot operation are determined in the offline programming system 6, and numbered in series to define a robot operation path. Based on the operation path, a robot program is prepared by the offline programming system 6, which then performs a simulation based on the robot program to confirm whether or not the program operates correctly. In this manner, the robot program is prepared.

Then, characteristic points are set on the three-dimensional workpiece model that are used for correction of the workpiece model and the robot program. Two or more characteristic points are set, if the position or orientation of the workpiece varies two-dimensionally. Three or more characteristic points are set, if it varies three-dimensionally. In this embodiment, three characteristic points are set. As the characteristic points, workpiece portions such as corner, hole, mark, etc. are selected, which can be easily recognized in the workpiece image captured by the visual sensor 4.

Various data prepared by the offline programming system 6 are delivered to the PC 5 and to the robot controller 1 through the cables 7. Specifically, three-dimensional layout data, model data, jog-feed coordinate system data, characteristic point data are delivered to and stored in the PC 5. The robot program is delivered to the robot controller 1, to be stored therein.

It is expected that the layout of the three-dimensional models of robot, workpiece, peripheral equipment, etc. in a robot operating space coincides with an actual layout of robot, workpiece etc. However, the three-dimensional model layout is often deviated from the actual one, attributable to data error, fine layout adjustments at the worksite, etc. To eliminate such deviation, the robot program prepared offline is to be corrected.

In the embodiment, after completion of layout of the three-dimensional models of the workpiece, etc. in the robot operating space (i.e., after the preparation of the three-dimensional models), the actual layout of the workpiece is measured using the visual sensor 4, and based on measurement results, the layout of the three-dimensional workpiece model is corrected, and the robot program is corrected.

Figure 2:
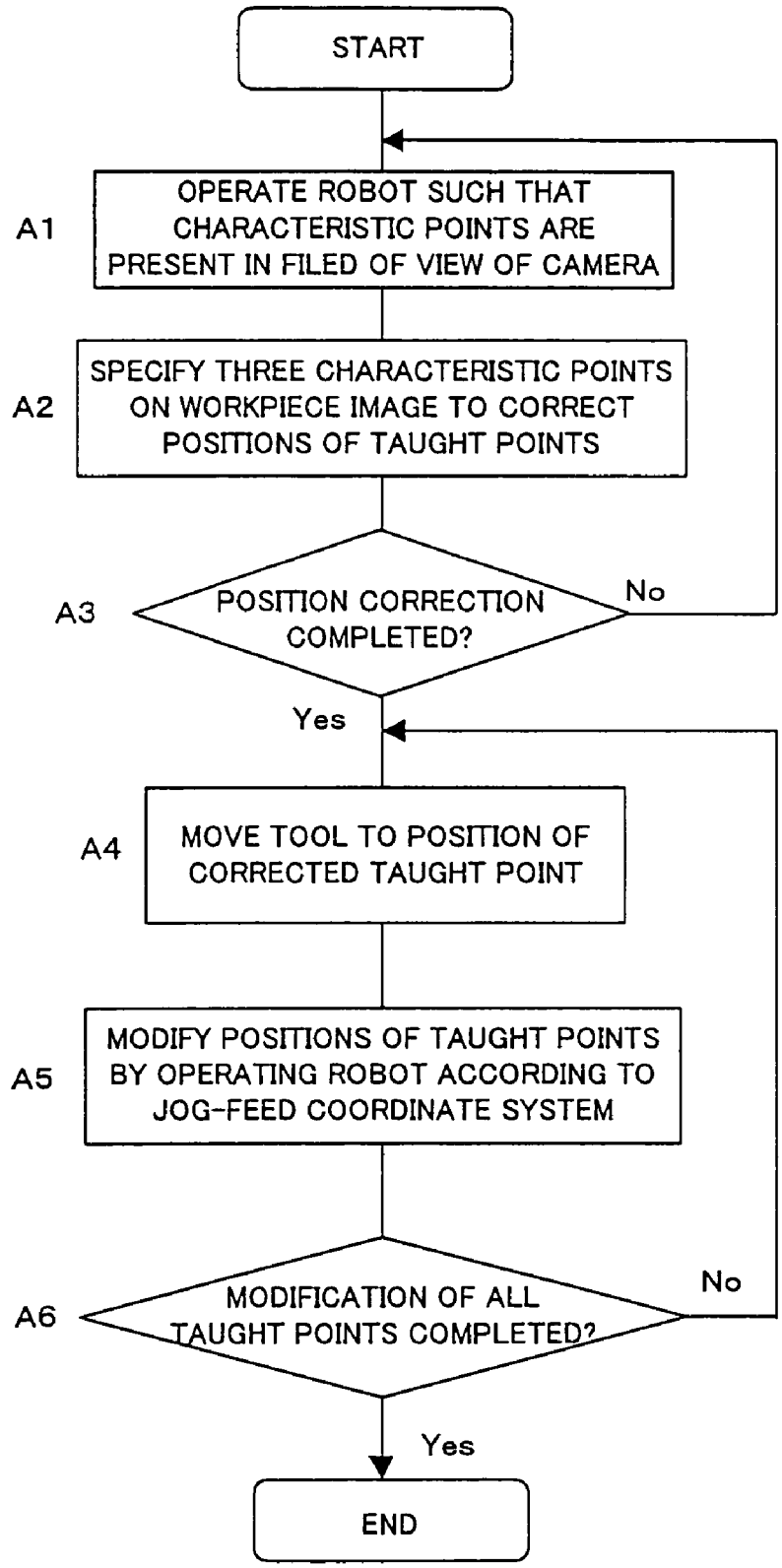
FIG. 2 is a view showing the outline of procedures of correcting a robot program and a three-dimensional workpiece model in the robot system shown in FIG. 1.

FIG. 2 shows the outline of correction procedures.

Figure 3:
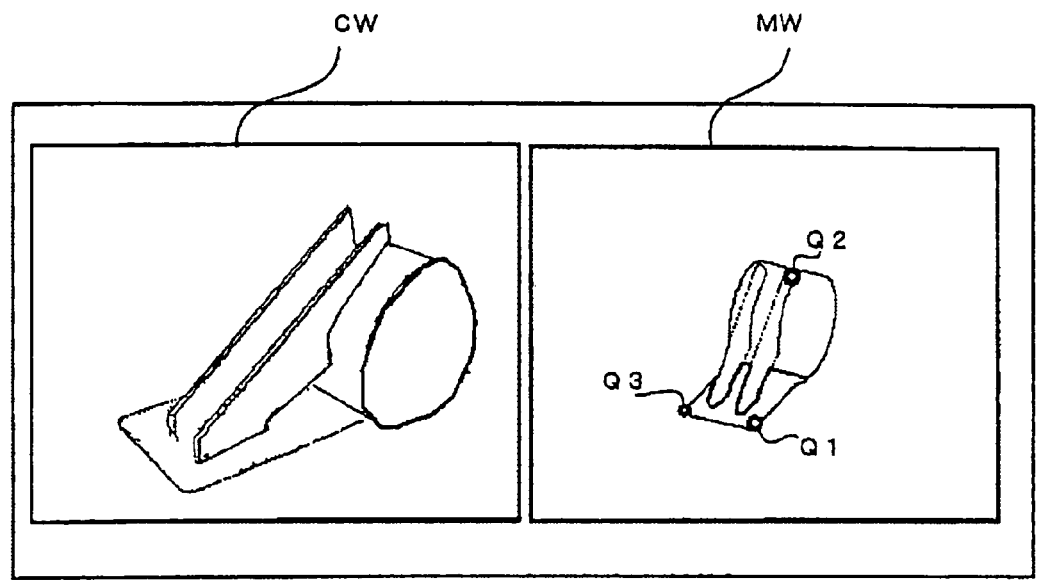
FIG. 3 is a view of an image of a three-dimensional workpiece model and an image of a workpiece respectively displayed on a screen of a teaching pendant shown in FIG. 1.

For correction of the three-dimensional workpiece model, a workpiece image captured by the visual sensor 4 is displayed as shown in FIG. 3 in a left window CW on the display screen of the teaching pendant 3, and an image of the three-dimensional workpiece model is displayed together with three preset characteristic points Q1, Q2 and Q3 preset on the workpiece in a right window MW on the screen based on the data acquired from the PC 5.

In order to display a workpiece image suitable for the correction, the robot 2 is jogged in such a manner that one or more of the characteristic points Q1-Q3 on the workpiece are within the field of view of the visual sensor 4 (A1 of FIG. 2).

Figure 4:
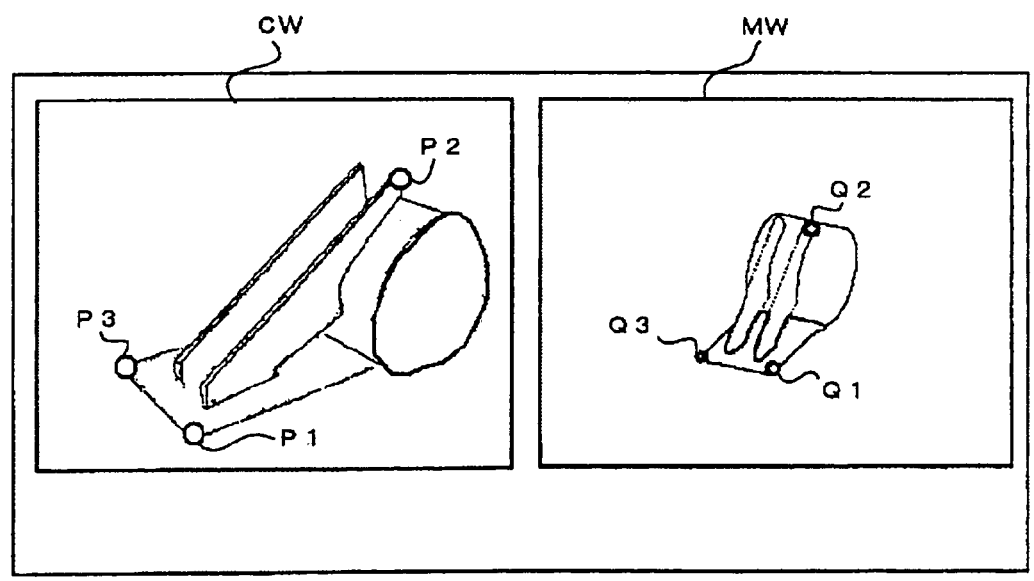
FIG. 4 is a view for explaining how characteristic points are specified in the workpiece image.

Specifically, an operator operates jog-feed buttons on the teaching pendant 3 to move the visual sensor 4 attached to the robot 2 to a position where the characteristic points Q1-Q3 fall within the field of view of the visual sensor (for example, a position right above a triangle connecting the characteristic points Q1-Q3). After the visual sensor 4 is moved to such a position, so that a workpiece image in which one or more characteristic points can be seen is displayed in the left window CW of the screen of the teaching pendant 3, the operator clicks a portion of the workpiece image in the left window CW that corresponds to one of the characteristic points Q1-Q3 with reference to the characteristic points Q1-Q3 in the workpiece model displayed in the right window MW, thereby specifying one characteristic point in the workpiece image. Subsequently, two workpiece portions in the image displayed in the left window CW are sequentially specified that individually correspond to the remaining two of the characteristic points Q1-Q3, while the robot is jogged where necessary. As a result, three characteristic points P1-P3 are indicated by circle marks as shown in FIG. 4 in the workpiece image displayed in the left window CW. Pieces of information on respective X and Y coordinate values of the characteristic points P1-P3 are delivered to the PC 5.

After confirming based on the circle mark representation that the characteristic points P1-P3 have been specified, the operator operates the teaching pendant 3 to input a position correction command. In response to this, the PC 5 calculates the position and orientation of the actual workpiece on the basis of coordinate data on the characteristic points P1-P3. Then, the PC 5 corrects the position and orientation of the three-dimensional workpiece model in the robot operating space, and corrects respective positions of operation points (taught points) and the characteristic points Q1-Q3 on the model. Based on the coordinate data of the characteristic points P1-P3, the PC 5 also corrects taught points in the robot program read from the robot controller 1 (A2 of FIG.

2). As a result of the correction, the taught points in the program are as a whole shifted from those before the correction.

Figure 5:
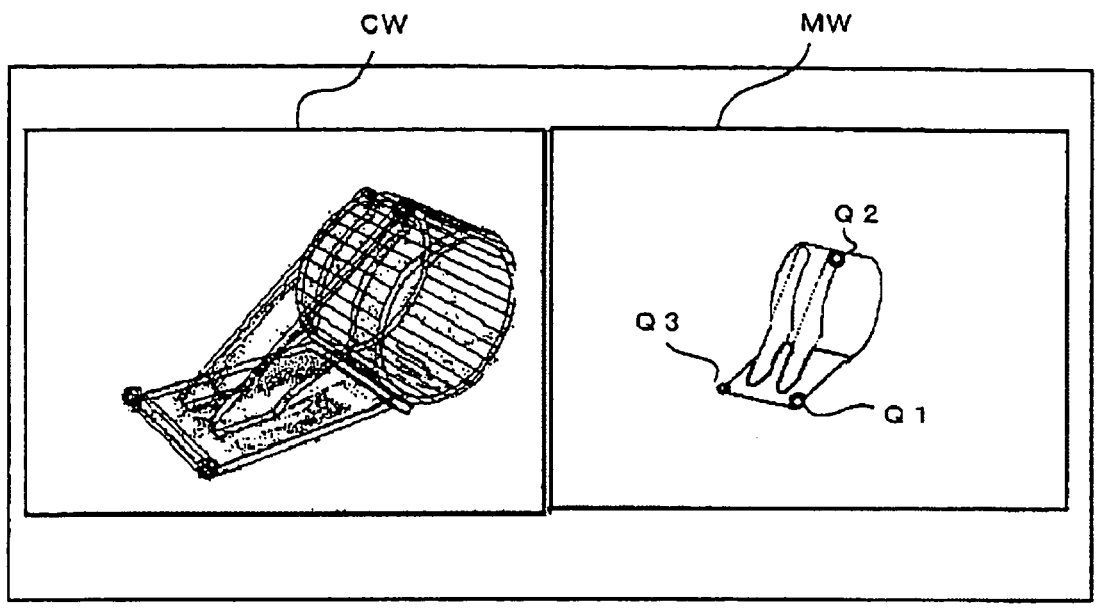
FIG. 5 is a view showing an example of wire-frame representation of the three-dimensional workpiece model whose position/orientation has been corrected based on the specified characteristic points.

Data of the position-corrected three-dimensional workpiece model is delivered from the PC 5 to the teaching pendant 3 through the robot controller 1. The teaching pendant 3 displays the workpiece image captured by the visual sensor 4 and a wire-frame representation of the three-dimensional workpiece model whose position and orientation have been corrected, in such a manner that the wire-frame representation overlaps the workpiece image as shown in FIG. 5. Referring to the overlap representation, the operator confirms whether or not the position and orientation of the three-dimensional workpiece model have been corrected satisfactorily (A3 in FIG. 2). If the correction of the position and orientation is inadequate (if the wire-frame representation is largely deviated from the workpiece image captured by the visual sensor), the first procedure A1 is performed again for the position correction of the three-dimensional model, after the robot 2 is moved such that the characteristic points Q1-Q3 of the workpiece fall within the field of view of the visual sensor 4.

Figure 6:
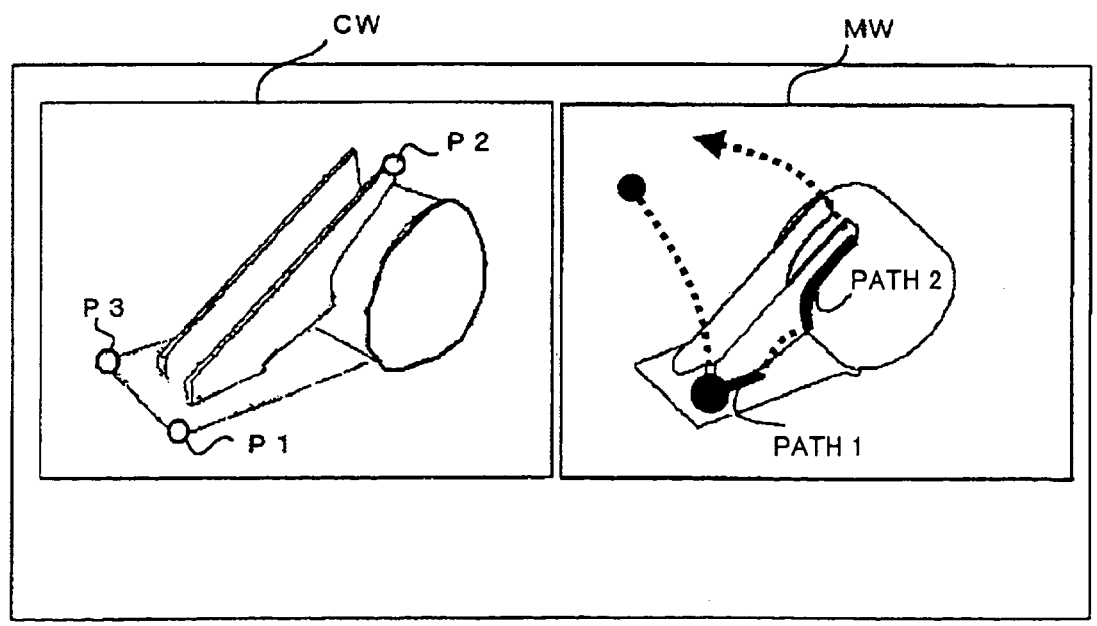
FIG. 6 is a view showing a display example of a robot program path and the three-dimensional model whose position/orientation has been corrected.

When the operator determines based on the overlap representation shown in FIG. 5 that an adequate position correction has been made, and then inputs a next executable command through the teaching pendant 3, the three-dimensional workpiece model whose position and orientation have been corrected is graphically displayed in the right window MW of the screen of the teaching pendant 3, together with a robot operation path based on the robot program, as shown in FIG. 6. A taught point scheduled to be modified (initially, a first taught point) is also displayed with emphasis.

When the operator inputs a teaching-point modification command through the teaching pendant 3, the robot 2 is moved toward the taught point scheduled to be modified, which is displayed with emphasis, and stopped at the position represented by a corresponding one of the taught points in the program. This taught point has been corrected together with the three-dimensional workpiece model based on the coordinate data of the characteristic points P1-P3, so that an error of this programmed taught point with respect to an associated objective or intended point on the actual workpiece becomes smaller than the taught point in the program prepared offline. By positioning the robot 2 at the position represented by the corrected taught point, the robot 2 can automatically reach the vicinity of the actual operation point on the workpiece (A4).

Even if the correction of the workpiece model has been made, the robot 2 can sometimes collide with the workpiece on the way to the taught point depending on the error between the workpiece model and the actual workpiece. In that case, the operator operates the teaching pendant 3 to stop the robot 2.

Figure 7:
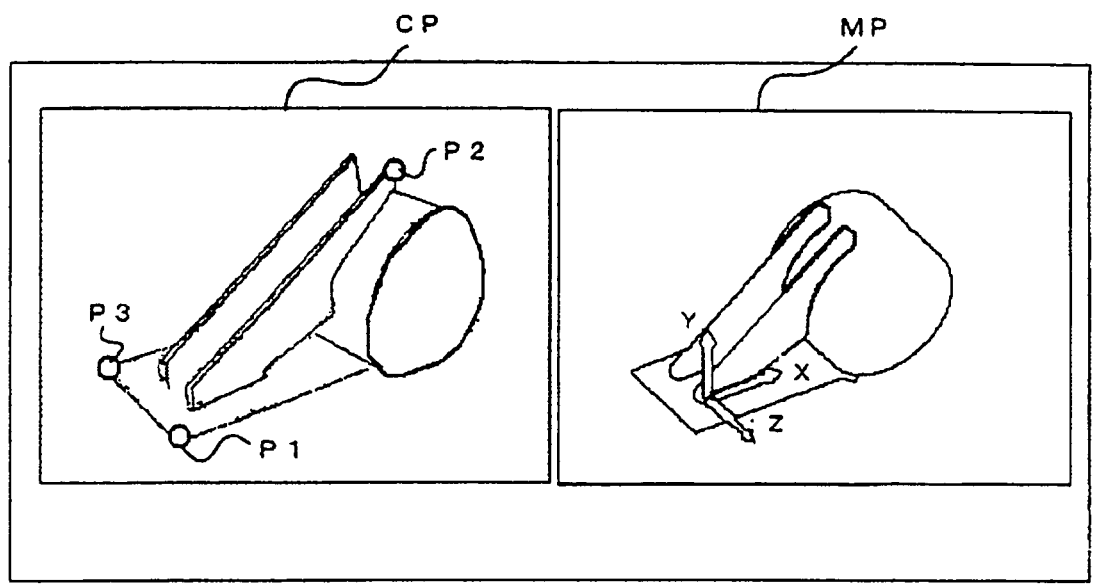
FIG. 7 is a view showing an example of display used for position modification of a taught point.

When the taught point scheduled to be modified is selected, the PC 5 sets a jog-feed coordinate system whose coordinate origin is at that taught point, and notifies the robot controller 1 of the jog-feed coordinate system. In this embodiment, the jog-feed coordinate system has X, Y and Z axes, wherein the X axis corresponds to an arc welding line at which two arc welding planes cross each other that respectively correspond to XY and XZ planes, and arc welding is performed in the positive X direction. Thus, the positive Y and Z directions are taken away from the workpiece. The coordinate axes and their directions of the jog-feed coordinate system are displayed on the screen of the teaching pendant 3, as shown in FIG. 7.

With reference to the displayed jog-feed coordinate system, the operator gives a jog-feed command to the robot 2 so as to jog the robot to the accurate taught point, after the robot 2 is automatically moved to the programmed taught point that is near the accurate taught point. When the robot is moved to the position of the accurate taught point, the operator inputs a modification completion command (A5). Each time the position of a selected one of taught points is modified, positions of unmodified taught points are automatically modified on the basis of data on one or more currently or already modified taught points. With increase in the number of times the modification is made, therefore, errors of the taught points, including ones that have not been selected for the modification, become smaller.

The above-mentioned position modification is made in respect of all the taught points, whereby the position correction of the taught points in the robot program is completed.

The above is the overall operation for the position correction processing.

Figure 8:
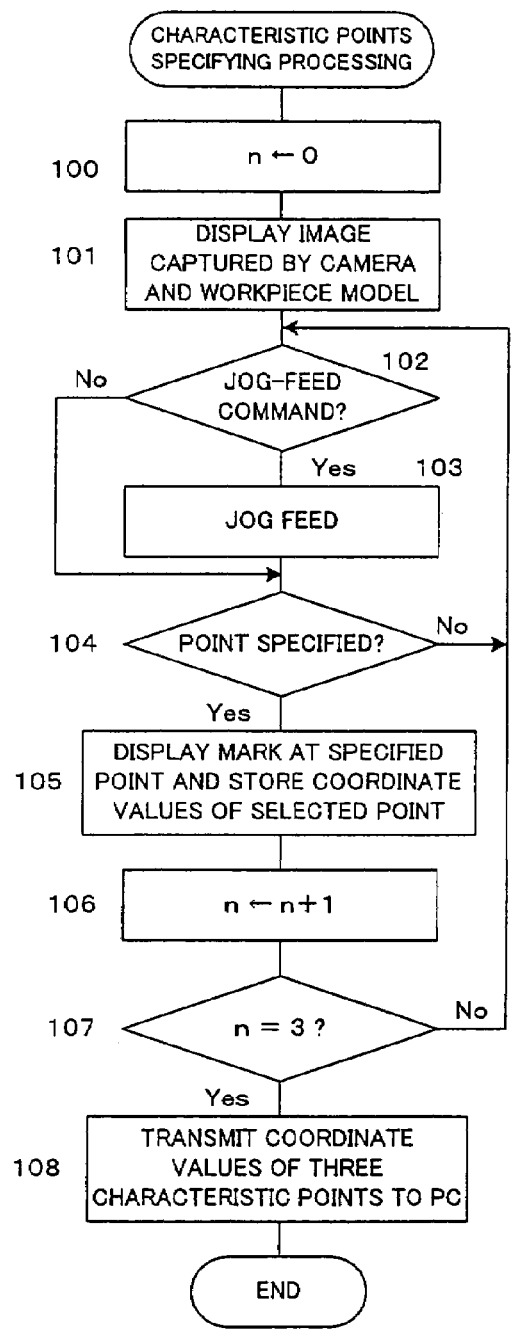
FIG. 8 is a flowchart of processes for specifying characteristic points.
Figure 9:
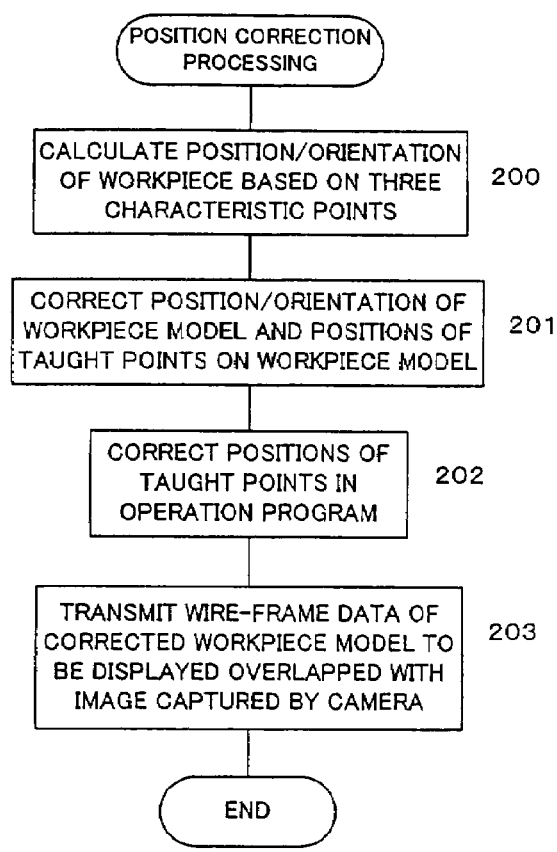
FIG. 9 is a flowchart of processes for position correction.

FIGS. 8 and 9 are flowcharts respectively show the processing executed by the processor of the robot controller 1 and the processing executed by the PC 5 for the correction of the robot program and the three-dimensional workpiece model.

When the teaching pendant 3 is operated by the operator to make a changeover to the characteristic point setting mode, the processor of the robot controller 1 starts the processing of FIG. 8 in which an index n is set to 0 (Step 100), and then a picture image of the workpiece captured by the visual sensor 4 and a three-dimensional workpiece model are individually displayed in the left and right windows CW, MW on the display screen of the teaching pendant 3, as shown in FIG. 3 (Step 101). On this occasion, X and Y coordinate values, if any, of characteristic points P1-P3 stored at the preceding characteristic point designation are cleared, so that no circle marks indicative of characteristic points appear in the workpiece image displayed in the left window CW.

Then, the operator operates jog-feed buttons of the teaching pendant 3 to jog the robot 2 and the visual sensor 4 attached thereto, in such a manner that one or more workpiece portions corresponding to one or more characteristic points of the three-dimensional workpiece model appear in the workpiece image captured by the visual sensor 4. When determining that a jog-feed command is input from the teaching pendant 3 (Step 102), the processor of the robot controller 1 operates the robot 2 to move in a commanded jog feed direction (Step 103). When one or more workpiece portion, corresponding to one or more of the characteristic points Q1-Q3 of the workpiece model, appear in the workpiece image, the operator selects the workpiece portion in the workpiece image by using a cursor or the like to thereby specify the characteristic point P1, P2 or P3. In response to this, the processor causes a mark (circle mark, for instance) to be indicated on the characteristic point P1, P2 or P3 in the workpiece image, and stores X and Y coordinate values of the characteristic point P1, P2 or P3 (Step 105).

Then, the index n is incremented by one (Step 106), and whether or not the incremented index n reaches the prescribed number, 3, of the characteristic points is determined (Step 107). If the index n does not reach the value of 3, the flow returns to Step 102. Subsequently, if a workpiece portion corresponding to another characteristic point is specified in the workpiece image (Step 104), X and Y coordinate values are stored and the index n is incremented (Steps 105 and 106). If the index n reaches 3, that is, if all of the three characteristic points P1, P2 and P3 are specified in the workpiece image, and their X and Y coordinate values are determined (see, FIG. 4), these X and Y coordinate values of the three characteristic points are transmitted to the PC 5 (Step 108).

When the designation of the positions P1-P3 in the workpiece image individually corresponding to the characteristic points Q1-Q3 is completed, the operator operates the teaching pendant 3 to make a changeover to the position correction mode. In response to this, the PC 5 starts the processing shown in FIG. 9.

First, the PC 5 calculates the position and orientation of the actual workpiece on the basis of the X and Y coordinate values of the characteristic points P1-P3 transmitted from the robot controller 1 (Step 200), and corrects the position and orientation of the three-dimensional workpiece model in the robot operating space, and also corrects positions of the taught points on the workpiece model (Step 201). Then, the PC 5 reads the robot operation program stored in the robot controller 1 and corrects the positions of the taught points in the operation program (Step 202). The PC 5 transmits wire-frame data of the three-dimensional workpiece model whose position and orientation have been corrected to the teaching pendant 3 (Step 203). The teaching pendant 3 displays an image of the workpiece model corresponding to the wire-frame data in such a manner that the wire-frame representation overlaps the workpiece image displayed in the left window CW, as shown in FIG. 5.

The operator observes the overlap representation of the workpiece image captured by the visual sensor and the wire-frame image of the three-dimensional workpiece model, and determines whether or not there is a large deviation between these two images. If a large deviation is present therebetween, the operator causes the robot controller 1 to execute the characteristic point specifying processing shown in FIG. 8, in which the position of the visual sensor 4 is changed in such a manner that the workpiece including its characteristic points falls within the field of view of the visual sensor 4, and then the operator sequentially specifies the characteristic points P1, P2 and P3 on the resultant workpiece image captured by the visual sensor. After X and Y coordinate values the characteristic points P1-P3 are determined, the operator causes the PC 5 to execute the processing shown in FIG. 9 again. Thus, the processing shown in FIGS. 8 and 9 are repeated until a deviation between the workpiece image captured by the visual sensor and the wire-frame image of the workpiece model after the position correction is satisfactorily reduced.

Figure 10:
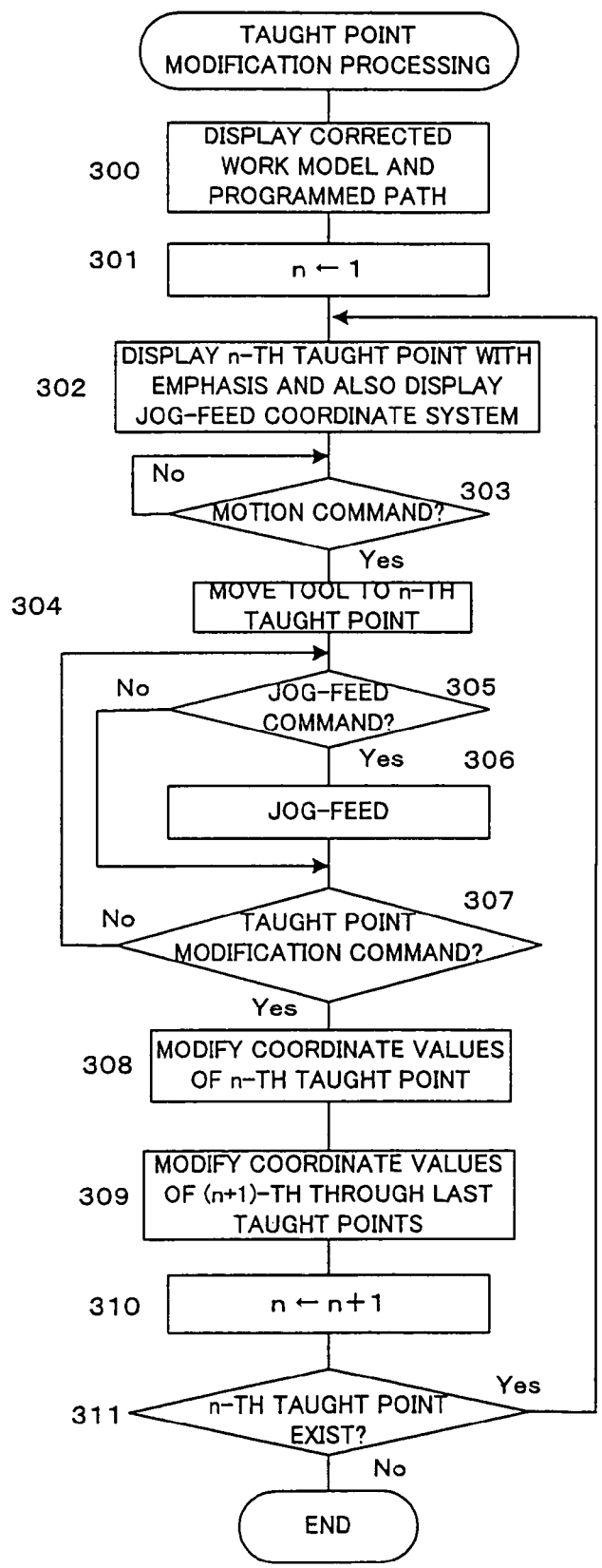
FIG. 10 is a flowchart of processes for modification of taught points.
Figure 2:
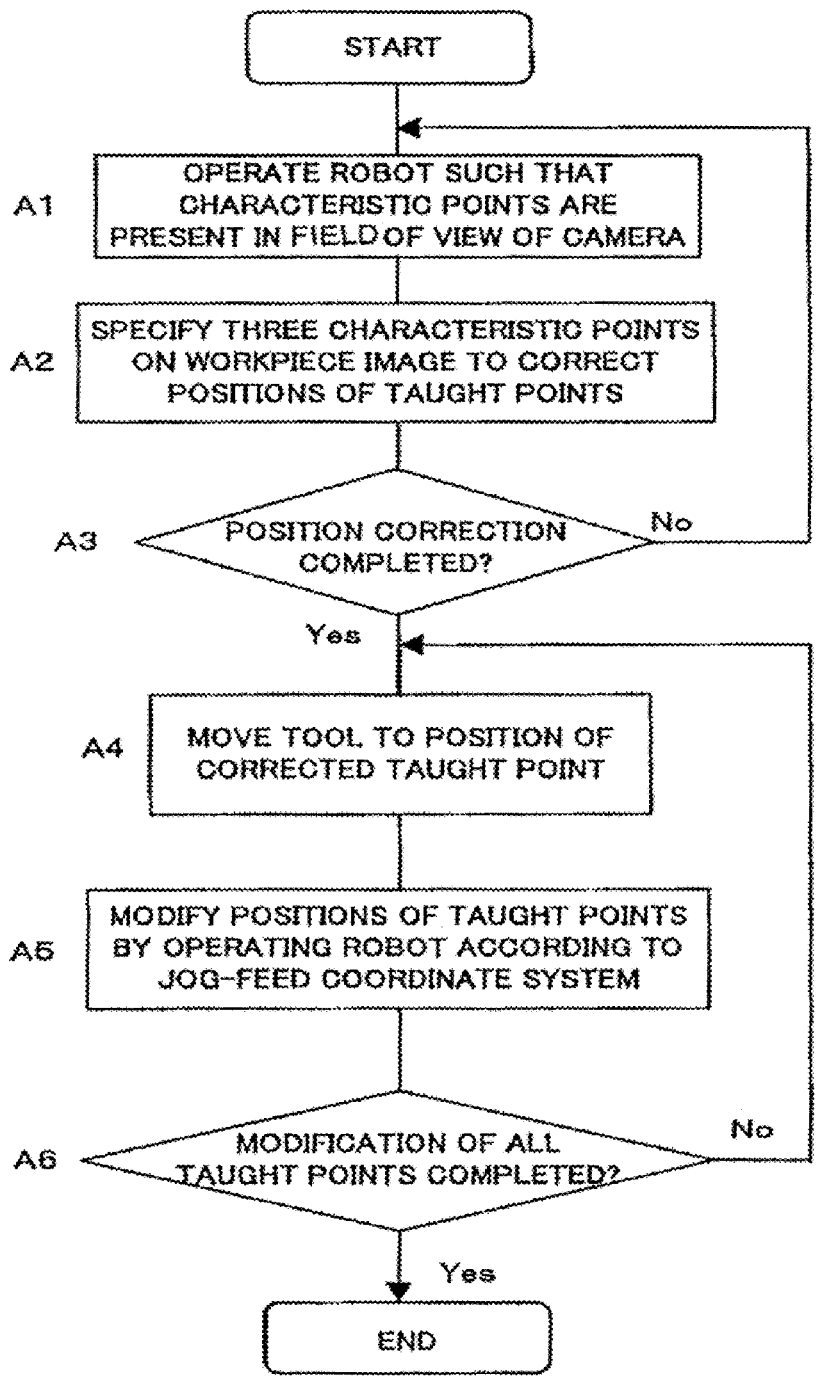

When determining that the deviation between the images is reduced satisfactorily, the operator operates the teaching pendant 3 to make a changeover to the taught point modification mode. In response to this, the processor of the robot controller 1 starts the processing shown in FIG. 10. First, the processor causes the teaching pendant 3 to display the three-dimensional workpiece model and the path in the robot program having been corrected by Steps 201, 202 of FIG. 9 in the left and right windows CW, MW of the screen, respectively, as shown in FIG. 6 (Step 300). For the display of the corrected three-dimensional workpiece model, the PC 5 delivers data for the corrected workpiece model to the teaching pendant 3. Next, the processor sets an index n to 1 (Step 301), and causes the teaching pendant 3 to display with emphasis the n-th taught point (here, the first taught point) specified by the index n. Then, from the PC 5, the processor receives data of the jog-feed coordinate system that is set at the taught point specified by the index n, and causes the teaching pendant 3 to display the jog-feed coordinate system on the screen as shown in FIG. 7 (Step 302).

Next, when receiving a motion command that is input by the operator, the processor of the robot controller 1 causes the robot 2 to move from its current position to a position of the corrected taught point that is displayed with emphasis (Steps 303 and 304). On the way to the taught point, if there is a fear that a distal end of the robot, etc., collides with the workpiece, etc., the operator operates the teaching pendant 3 to stop the robot and then moves the robot to the taught point by way of a safety path.

The processor determines whether or not a jog-feed command is input after the robot 2 is moved to and stopped at the corrected taught point whose image is displayed with emphasis on the screen (Step 305). When the robot 2 is stopped at that point, the operator determines whether or not the stop position coincides with an objective position for the taught position. In this embodiment for modifying the positions of the taught points in the robot program for arc welding, the operator determines whether or not a welding torch serving as operation tool (or a position correction tool instead of the torch) is positioned at the intended position. If the torch end position (i.e., the stop position of the robot) does not coincide with the objective position, the operator operates the teaching pendant 3 to input a jog-feed command. In response to this, the processor causes the robot 2 to jog so as to position the torch end at the objective position (Steps 305 and 306). When the torch end is positioned at the objective position, the operator inputs a taught-position modification command through the teaching pendant 3. The processor receives this command and then modifies the position of the programmed taught point specified by the index n to the robot operation position at that time which is represented by X, Y and Z coordinate value of a control point (TCP) of the robot 2 (Steps 307 and 308).

Using an amount of this modification, i.e., deviation between the programmed position and the robot operation position, the processor also modifies respective coordinate values of the next and subsequent taught points (Step 309), increments the index n by one (Step 310), and determines whether or not the taught point specified by the incremented index n corresponds to the last taught point (Step 311). If there is a remaining taught point, the flow returns to Step 302, and the processing of Step 302 and the subsequent steps is performed.

The position correction processing is completed when the position modification for the last taught point is completed.

In Step 309, the positions of the remaining taught points subsequent to the currently modified taught point are preliminarily modified, whereby errors in the remaining taught points are notably reduced with advance of the position modification, making it possible to easily perform the subsequent position modification. However, the preliminary modification at Step 309 is not inevitably necessary. The positions of the taught points can be modified without the preliminary modification.

According to this invention, the taught points in the program are corrected on the basis of the position or orientation of the object determined based on the two or more characteristic points of the operation object that are captured by the visual sensor. In addition to the correction based on the position or orientation of the operation object, the taught points in the program are modified based on the position of the control point determined when the tool is positioned by the jog feed, thus making it possible to easily perform modification of the operation program, which is prepared by the offline programming system, at the worksite.

An operator can perform the modification of the operation program referring to an image of the model of the object displayed on the display device of the teaching pendant by the simple jog feed using the jog-feed coordinate system.

What is claimed is:

1. A taught position modification device for correcting positions of taught points in an operation program of a robot prepared by an offline programming system, using a visual sensor arranged at a movable part of the robot, said device comprising:
   determining means for determining a position or an orientation of an object of operation based on positions of at least two characteristic points on an image of the object captured by the visual sensor;
   correction means for correcting the positions of the taught points in the operation program based on the determined position or orientation of the object;
   moving means for moving an operation tool or a position correction tool attached to a distal end of an arm of the robot at the corrected positions of the taught points;
   setting means for setting a jog-feed coordinate system with respect to the corrected positions of the taught points using information from the offline programming system; and
   modification means for modifying the corrected positions of the taught points in the operation program based on positions of a control point of the operation tool or the position correction tool, at which positions or orientations of the operation tool or the position correction tool are designated by jog feeds using the jog-feed coordinate system such that the control point takes objective positions for the taught points.

2. A taught position modification device according to claim 1, further comprising display means for displaying an image of a model of the object based on information from the offline programming system, and for indicating coordinate axes of the jog-feed coordinate system in accordance with lines defined by the corrected positions of the taught points in the image of the model.

3. A taught position modification device according to claim 1, where said modification means modifies the positions of subsequent taught points in accordance with modification of one of the taught points each time when the position of the one of the taught points is modified.

4. A taught position modification device according to claim 3, wherein said moving means moves the operation tool or the position correction tool to the position of the subsequent taught point which is modified in accordance with the modification of the one taught point, on demand of an operator.

* * * * *

UNITED STATES PATENT AND TRADEMARK OFFICE
CERTIFICATE OF CORRECTION

PATENT NO. : 7,376,488 B2
APPLICATION NO. : 10/786055
DATED : May 20, 2008
INVENTOR(S) : Atsushi Watanabe et al.

It is certified that error appears in the above-identified patent and that said Letters Patent is hereby corrected as shown below:

Sheet 2 of 7, FIG. 2, Referral Numeral A1, Line 3, change "FILED" to --FIELD--.

Column 4, Line 4, after "workpiece" insert --,--.

Signed and Sealed this

Thirtieth Day of September, 2008

JON W. DUDAS
*Director of the United States Patent and Trademark Office*